United States Patent [19]

Farrington

[11] Patent Number: 4,978,991

[45] Date of Patent: Dec. 18, 1990

[54] OPEN-LOOP STEPPER MOTOR CONTROLLED SHUTTER

[75] Inventor: David L. Farrington, Boxborough, Mass.

[73] Assignee: Polaroid Corporation, Cambridge, Mass.

[21] Appl. No.: 459,126

[22] Filed: Dec. 29, 1989

[51] Int. Cl.⁵ .............................................. G03B 7/08
[52] U.S. Cl. .................................. 354/436; 354/439; 354/230
[58] Field of Search .............................. 354/435–440, 354/412, 228–232, 245–249

[56] References Cited

U.S. PATENT DOCUMENTS

| | | | |
|---|---|---|---|
| 3,942,183 | 3/1976 | Whiteside | 354/436 |
| 4,243,309 | 1/1981 | Johnson et al. | 354/230 |
| 4,325,614 | 4/1982 | Grimes | 354/437 |
| 4,354,748 | 10/1982 | Grimes et al. | 354/437 |
| 4,427,276 | 1/1984 | Feinerman et al. | 354/412 |
| 4,697,908 | 10/1987 | Ogihara et al. | 354/439 |

*Primary Examiner*—L. T. Hix
*Assistant Examiner*—David M. Gray
*Attorney, Agent, or Firm*—John J. Kelleher

[57] ABSTRACT

An exposure control system for a camera having a scanning type shutter mechanism for forming a range of aperture areas through which a photographic image is formed includes a stepper motor and a regulator or open loop control system therefor, to actuate the shutter mechanism between its open and closed positions in correspondence with a predetermined set of aperture area defining curves selected in accordance with sensed scene brightness and subject reflectivity levels. The stepper motor is operated at a relatively low rate of speed in order to avoid shutter blade mechanism overshoot and to achieve substantially the same shutter mechanism positioning accuracy as that achieved with a closed loop control system. Employing a stepper motor together with an open loop control system for scanning shutter mechanism actuation in the above member, results in a simplified exposure control system that is both compact and relatively inexpensive.

8 Claims, 3 Drawing Sheets

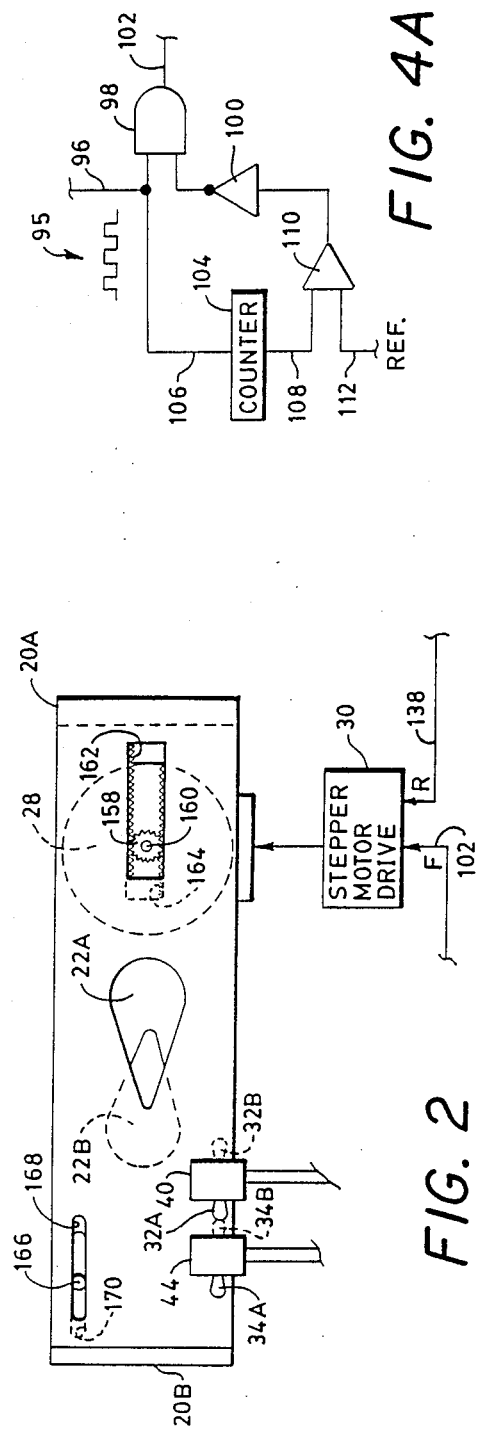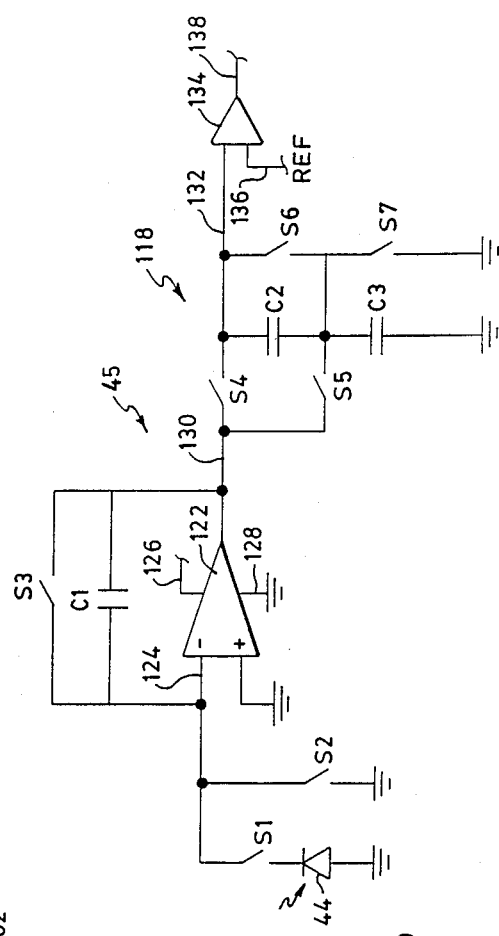
FIG. 4A
FIG. 2
FIG. 4B

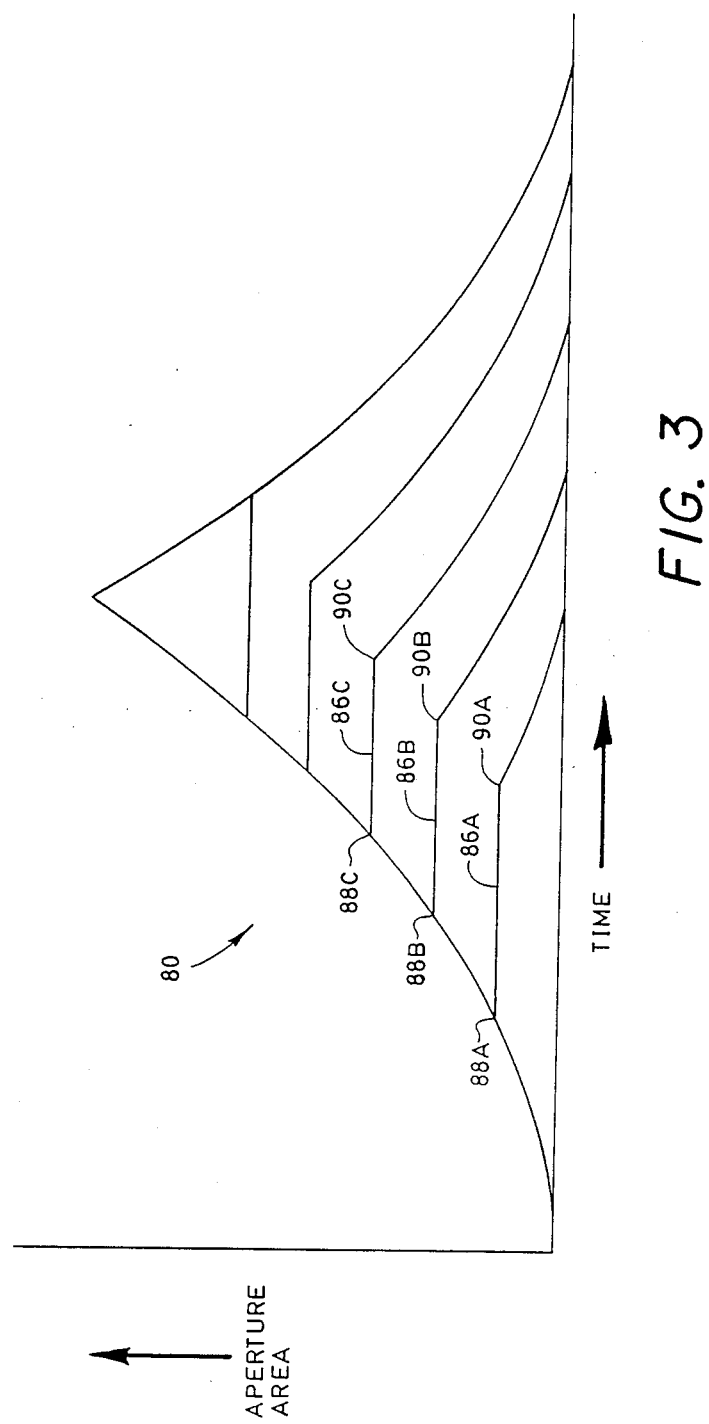

OPEN-LOOP STEPPER MOTOR CONTROLLED SHUTTER

BACKGROUND OF THE INVENTION

1. Field of the Invention

The present invention relates to exposure control systems for photographic apparatus, in general, and to the stepper motor control of a dynamic aperture or scanning type shutter mechanism in a photographic camera, in particular.

2. Description of the Prior Art

A scanning type shutter mechanism operated under the control of a photoelectric circuit that measures and integrates ambient scene light level, and provides a trigger signal at a predetermined percentage of optimum exposure value to initiate the shutter mechanism closing phase of a film exposure interval is well known in the prior art.

Typically, a scanning type shutter mechanism includes a pair of shutter blade elements that are displaceable between a light blocking first arrangement where the exposure aperture is closed and a second arrangement where the shutter blade elements cooperate to define a maximum available exposure aperture. As the blade elements open, the area of the exposure aperture progressively increases until a peak aperture is reached and then the direction of each blade element displacement is reversed causing the exposure aperture area to progressively decrease until it closes to terminate the exposure interval. The peak aperture is the largest aperture opening that is achieved during the course of an exposure interval and it may be smaller than the maximum available aperture. In an ambient or natural available light mode of operation the peak aperture is generally correlated to ambient scene light level. In an artificial or flash mode of operation, peak aperture is typically selected in accordance with both camera-to-subject distance and ambient scene light level inputs.

During the ambient mode of operation a light detection and integration circuit monitors the scene light level as the blade elements open and provides a signal at a predetermined percentage of optimum exposure value to trigger the blade closing phase. Because of inertial characteristics of the blade mechanism, and its associated drive system it is impossible to achieve instant blade mechanism closure. Thus, there will be some finite time between the generation of a trigger signal to command blade mechanism closure and movement of the blade mechanism to its fully closed position, during which time the exposure will continue. If the blade mechanism has not reached the maximum exposure aperture defining position where the blades are at rest when the trigger signal is provided, it will also take some time for blade deceleration and reversal of the drive direction. In other words, there will be some overshoot time which also must be accounted for to achieve total control over the exposure process.

Several scanning type shutter mechanism drive systems incorporating means for anticipating the degree of the shutter blade mechanism overshoot during an exposure interval and compensating for same have been disclosed in the art. In one type of scanning type shutter mechanism such as that described in U.S. Pat. No 3,942,183 to Whiteside, the shutter mechanism is driven between its open and closed positions by a drive system incorporating an electrical solenoid and a spring arrangement. The shutter mechanism includes a pair of overlapping shutter blade elements interposed between an objective lens and a film plane. The solenoid and spring arrangement is coupled to each of the shutter blade elements through a pivotable link or walking beam. Scene light admitting primary apertures are provided in each of the shutter blade elements. Each of these primary apertures are selectively shaped and positioned such that they overlap the central optical axis of the taking lens to collectively define a gradually varying primary opening when actuated between their open and closed positions by the above-mentioned solenoid and spring drive system.

Each of the blade elements in the shutter mechanism also include at least one secondary aperture. The secondary aperture in one blade cooperates with the secondary aperture in the other blade to form a secondary opening therethrough. These cooperating secondary apertures are configured to track in a corresponding relationship with respect to scene light admitted through the primary apertures. With the primary and secondary apertures being formed in the same blade element and therefore being mechanically coupled to one another the secondary apertures move in the same manner as the primary apertures when the blade elements of the blade mechanism are displaced by the above-mentioned solenoid and spring drive, with respect to one another.

The amount of light admitted to the film plane through the primary apertures is controlled by an integrated signal generated by a photosensor that senses scene light through the secondary apertures. Compensation for the amount of primary aperture size overshoot that would otherwise occur during an exposure interval is provided, in this particular shutter mechanism drive system, by increasing the size of the secondary apertures over what they would have been absent the above-described blade mechanism overshoot problem. By increasing the size of the secondary apertures in this manner more scene light will be sensed by the photosensor through these apertures during an exposure interval. An end of exposure signal is generated by the integrator coupled to the output of the photosensor relatively early in the exposure interval to thereby anticipate and compensate for excessive exposure causing blade mechanism overshoot.

In another type of scanning type shutter mechanism such as those described in U.S. Pat. Nos. 4,325,614, 4,354,748 and 4,427,276, the shutter mechanism is displaceably driven by a stepper motor. The shutter mechanism includes a pair of overlapping shutter blade elements interposed between an objective lens and a film plane as in the above-noted Whiteside patent. Stepper motor control is provided by an automatic exposure control system that includes a microcomputer preprogrammed with data representing a plurality of different blade trajectory signal programs for different photographic conditions. The exposure control system includes a blade position encoder for sensing relative blade element position throughout an exposure interval. The blade position information provided by the blade position encoder is utilized, in part, to compensate for any potential excessive exposure that would otherwise be caused by blade mechanism overshoot. It should be noted that U.S. Pat. No. 4,325,614 to Grimes, cited above, also discloses an open loop exposure control system wherein the stepper motor is controlled by a plurality of different blade trajectory signal programs previously stored within a microcomputer. However, this particular embodiment makes no provision for the excess exposure problem created by blade mechanism overshoot.

Each of the overshoot compensating scanning type shutter mechanism drive systems mentioned above has one or more disadvantages. The solenoid and spring driven shutter mechanism is relatively bulky and is therefore unsuitable for use in a small or compact photographic camera. The stepper motor driven shutter mechanism is compact and is therefore quite suitable for use in a small or compact camera. However, the blade position encoder system, including that portion of the exposure control system associated therewith, increases exposure control system cost and complexity.

SUMMARY OF THE INVENTION

It is a primary object of the present invention, therefore, to provide an open loop controlled, stepper motor actuated shutter mechanism control system that will compensate for the excessive exposure that would otherwise be generated by blade mechanism overshoot.

It is another object of the present invention to provide a stepper motor actuated, shutter mechanism control system that will compensate for the excessive exposure that would otherwise be generated by blade mechanism overshoot that is of minimum size, cost and complexity.

Other objects, features and/or advantages of the present invention will be readily apparent from the following detailed description of a preferred embodiment thereof when taken in conjunction with the accompanying drawings.

In accordance with a preferred embodiment of the present invention an exposure control system for a photographic camera having a dynamic aperture or scanning type shutter mechanism for forming a range of aperture areas through which a photographic image is formed includes a stepper motor and an open loop control system therefor to actuate the shutter mechanism between its open and closed positions in a manner that compensates for excessive exposure producing shutter mechanism overshoot. The shutter mechanism is actuated between its open and closed positions in correspondence with a predetermined set of aperture area defining curves selected in accordance with sensed ambient scene brightness and subject reflectivity levels. Each of the curves causes the stepper motor to open and close at the same slow rate of speed during an exposure interval to thereby compensate for shutter mechanism overshoot.

BRIEF DESCRIPTION OF THE DRAWINGS

FIG. 2 is an enlarged detail of the shutter mechanism and shutter mechanism actuating stepper motor coupled thereto forming a portion of the shutter drive shown in FIG. 1;

FIG. 3 is a graph of a set of aperture area defining curves showing aperture area size versus time during an exposure interval;

FIG. 4A is a detail of an electrical circuit within the exposure control electronics module in FIG. 1 showing a circuit for counting the number of drive pulses applied to the stepper motor in FIG. 2; and FIG. 4B is a schematic diagram of a control circuit for reversing the stepper motor drive in response to a predetermined ambient scene light level.

DETAILED DESCRIPTION OF THE PREFERRED EMBODIMENT

Figure 1:
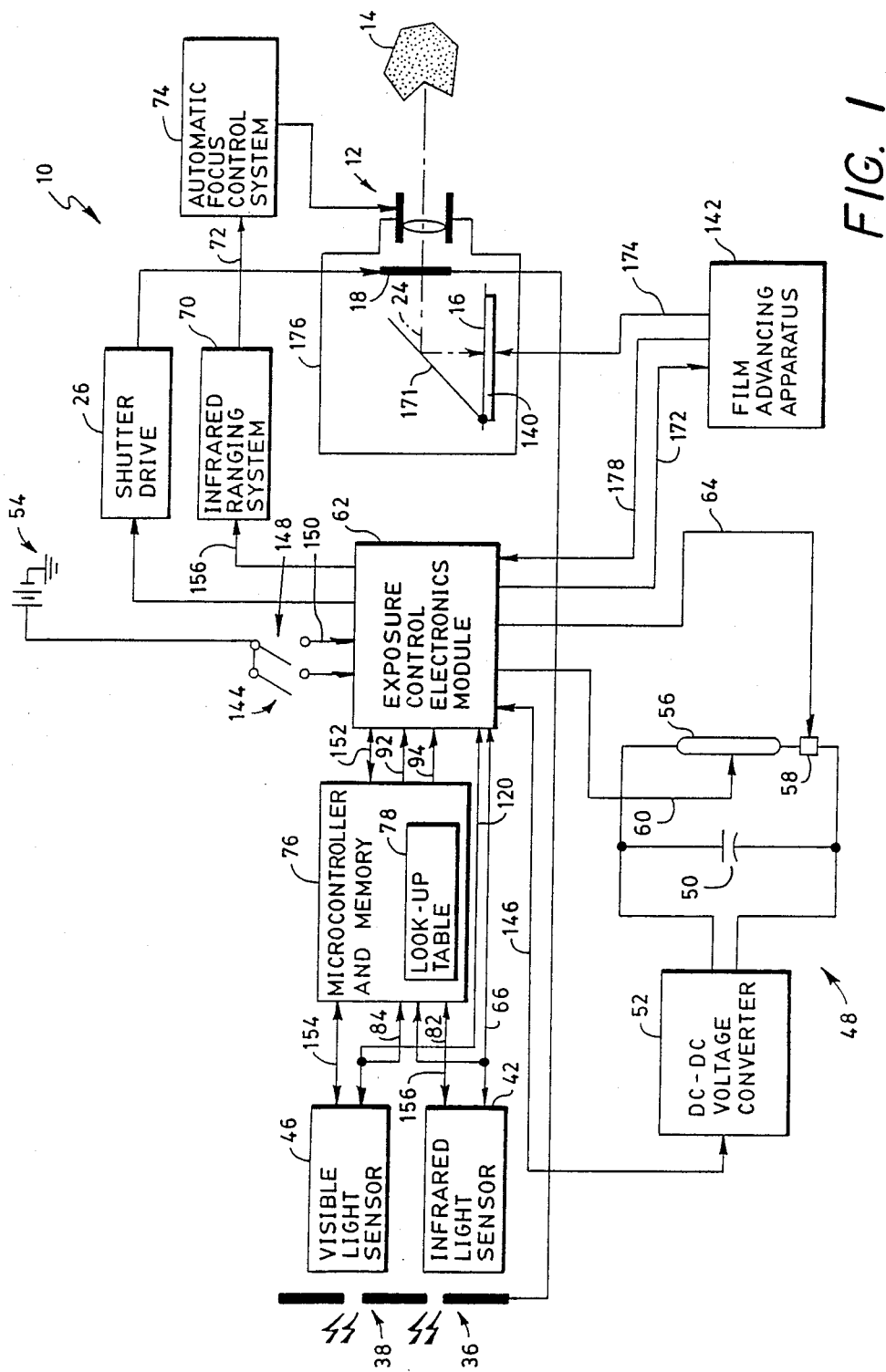
FIG. 1 is a schematic diagram of a photographic camera which incorporates a preferred embodiment of the stepper motor actuated exposure control system of the present invention.

Referring now to the drawings, and specifically to FIG. 1, there is shown a folding photographic camera 10 of the self-developing type which incorporates a preferred embodiment of the exposure control system of the present invention that compensates for excessive exposure producing overshoot. The camera 10 includes an objective or taking lens 12, of the adjustable focus type. The lens 12 is preferably in the form of a lens disc, such as that described in U.S. Pat. No. 4,243,309 to Johnson et al., for focusing image-carrying light rays of an object 14 onto a film plane 16 through an aperture formed in a shutter blade mechanism or assembly 18.

With additional reference to FIG. 2 of the drawings, the blade mechanism 18, positioned intermediate the lens 12 and the film plane 16, includes a pair of overlapping shutter blade elements 20A and 20B of the "scanning" type. Scene light admitting primary apertures 22A and 22B, are respectively provided in the blade elements 20A and 20B to cooperatively define a progressive and predictable variation of effective aperture openings in accordance with simultaneous displacement of one blade element with respect to the other blade element in a manner more fully described in commonly assigned U.S. Pat. No. 3,942,183 to Whiteside, now specifically incorporated herein by reference. The blade element apertures are selectively shaped so as to overlay the central optical axis 24 of the lens 12 thereby defining a gradually varying effective aperture size as a function of the position of the blades of the blade mechanism. A shutter drive 26 is provided for displacing the blade elements 20A and 20B. The shutter drive 26 includes a stepper motor 28 and stepper motor drive 30 therefor employed to displace the shutter blade elements with respect to one another in a manner more fully described in the above-noted Grimes '614 patent.

Each of the blade elements 20A and 20B of the blade mechanism 18 includes two secondary apertures 32A, 34A and 32B, 34B, respectively. The aperture 32A in the blade 20A cooperates with the aperture 32B in the blade 20B to form an opening 36 and the aperture 34A in blade 20A cooperates with aperture 34B in blade 20B to form an opening 38 through the shutter mechanism 18. These cooperating secondary apertures may be configured to track in a predetermined corresponding relationship with respect to the scene light admitting primary apertures 22A and 22B. With the primary and secondary apertures being formed in the same blade element and therefore being mechanically coupled to one another, it is readily apparent that the secondary apertures can move in the same manner as the primary apertures when the blade elements 20A and 20B are displaced, in the above-described manner, with respect to one another. The amount of artificial light admitted to the film plane 16 through the primary apertures 22A and 22B is controlled by a signal generated by a combination of an infrared photosensitive element 40 and an integrator (not shown) within an infrared sensor 42 that senses and integrates a corresponding amount of infrared scene energy through the opening 36. The amount of ambient scene light admitted to the film plane 16 through these primary apertures is controlled by a signal generated by a combination of a visible light photosensitive element 44 and an integrator 45 (FIG. 4B) within a visible light sensor 46 that senses and integrates a corresponding amount of visible ambient scene light, through the opening 38. An example of scanning blade elements having primary and secondary apertures that cooperate to control the amount of scene light admitted to a film plane is shown in U.S. Pat. No. 3,942,183, supra.

The camera 10 is also provided with an electronic flash apparatus 48 together with apparatus for controlling its energization in order to determine subject reflectivity and to provide a portion of the exposure value required to illuminate a scene to be photographed. The electronic flash apparatus 48 comprises a main storage capacitor 50 which may be charged up to an operating voltage by any conventional voltage converter circuit (not shown) which would be included within a DC-DC voltage converter 52. The DC-DC voltage converter 52 operates in a conventional manner to convert a DC voltage as may be derived from a battery 54 of the camera 10, which can be in the order of 6 volts, to a suitable operating voltage such as 280 volts. A flash tube 56 and a series connected thyristor 58 are collectively connected, in a parallel relation, with respect to the main storage capacitor 50. The flash tube 56 may be energized by a suitable trigger signal on a path 60 from a conventional trigger circuit (not shown) within an exposure control electronic module 62, and the thyristor 58 may be activated to its open state by a suitable trigger signal on a path 64 from another conventional trigger circuit (not shown) that is also included within the exposure control electronics module 62. When energized, the flash tube 56 illuminates the scene and subjects included therein with both visible and infrared light.

As mentioned above, the camera 10 is provided with an electronic flash apparatus 48 which provides an initial burst of illumination to be used in determining subject reflectivity and a second burst of illumination which is used to provide a portion of the exposure value required to illuminate a scene to be photographed. The light output of the electronic flash apparatus 48 is employed during an exposure cycle and prior to an exposure interval for the determination of subject reflectivity.

The reflectivity of a subject within a scene is determined in the following manner. When an exposure cycle is initiated, the conventional trigger circuit within the exposure control electronics module 62 transmits a trigger signal on the path 60 to initiate the firing of the flash tube 56. After an inherent delay of approximately five microseconds, the flash tube 56 starts to illuminate the scene with visible and infrared light. After a delay of approximately two microseconds from the triggering of the flash tube 56, the integrator within the infrared light sensor 42 is enabled by an enable signal from the exposure control electronics module 62 on a path 66. This two microsecond delay is for the purpose of minimizing the possibility of integrating error-producing noise generated by (1) the triggering of the flash tube 56 and by (2) the sensing of any ambient infrared light that might already be illuminating the scene prior to its being illuminated with light from the flash tube 56.

Thirty-five microseconds after the exposure control electronics module 62 has triggered the flash tube 56 to illuminate the scene, another conventional trigger circuit (not shown) within the exposure control electronics module 62 transmits a trigger signal on the path 64 to trigger the thyristor 58 to its open state and thereby initiate the extinguishing of the light output of the flash tube 56. At the same time that the thyristor 48 is triggered to initiate the extinguishing of the light output of the flash tube 56, the exposure control electronics module 62 disables the integrator within the infrared light sensor 42 through the path 66 to terminate its integration of the output current of the photosensitive element 44. The magnitude of the signal on the integrator within the infrared light sensor 42 at the time it is disabled by the exposure control electronics module 62, in this manner, constitutes a signal representative of subject reflectivity.

Photographic camera 10 is also provided with a conventional infrared ranging system 70 that is responsive to the above-mentioned subject reflectivity signal. When this subject reflectivity signal is applied to the input of the infrared ranging system 70, a signal representative of subject distance that is responsive to the magnitude of this subject reflectivity signal is generated on an output path 72.

An automatic focus control system 74 is coupled to the output of the infrared ranging system 70 through the path 72. As mentioned above, the objective or taking lens 12 is preferably in the form of a lens disc. This lens disc comprises a plurality of lens elements with each lens element having a different focal length. Each of the lens elements are mounted on a rotatable lens carrier. The automatic focus control system 74, in correspondence with the subject distance signal on the path 72, rotates the lens carrier into a position such that one of the lens elements on the lens carrier causes an image of a subject within the scene to be photographed by the camera 10 to be in focus at the film plane 16, prior to an exposure interval. An automatic focus control system functioning in this manner is described in U.S. Pat. No. 4,243,309, supra.

The exposure control system of the camera 10 additionally includes a microcontroller and memory 76. Included within the microcontroller 76 is an empirically derived look-up table 78. With additional reference to FIG. 3, a primary purpose of the look-up table 78 is to store at least characterizing elements of each curve in a set or family of aperture area defining curves 80 shown in drawing FIG. 3. Each curve is representative of a desired aperture area or size variation, as a function of time, of the effective aperture area formed by the primary apertures 22A and 22B in the blade mechanism 18. A curve in the family of aperture area defining curves 80 is employed to control the size of the effective aperture formed by the primary apertures 22A and 22B, with a curve being selected as a function of ambient scene light and of subject reflectivity.

The amount of artificial and ambient scene light transmitted to the film plane 16 is indirectly measured by sensing a portion of the artificial and ambient scene light through the openings 36 and 38 in the blade mechanism 18 with the photosensor 40 located within the infrared light sensor 42 and its associated integrator and the photosensor 44 located within the visible light sensor 46 and its associated integrator, respectively. A signal generated by the infrared sensor 40 and its associated integrator, representative of subject reflectivity, is routed to the look-up table 78 within the microcontroller 76 through a path 82 and a signal generated by the visible light sensor 44 and its associated integrator representative of ambient scene light is routed to the look-up table 78 within the microcontroller 76 through a path 84.

As noted above, the look-up table 78 within the microcontroller 76 stores at least characterizing elements of each curve in the set or family of aperture area defining curves 80 in FIG. 3. As shown in FIG. 3, the set of curves 80 is comprised of the separate and distinct curves 86A, 86B, 86C, etc. The look-up table 78 is empirically derived and is constructed in accordance with the subjective analysis of a multiplicity of photographic images of subjects located at various subject distances and having a range of reflectivities that are produced under a wide range of artificial and ambient scene lighting conditions.

As noted above with respect to FIG. 2, the shutter drive 26 includes a stepper motor 28 coupled to the shutter mechanism 18 and a stepper motor drive 30 for actuating the shutter mechanism 18 between its open and closed positions. The stepper motor drive 30 operates the stepper motor 28 at a fixed and equal rate when opening and closing the primary aperture formed in the shutter mechanism 18. When so driven, the area of this primary aperture changes as a parabolic function of time.

In this the preferred embodiment, two characterizing elements are selected and stored for each curve of the set of curves 80. One of the characterizing elements of each such curve is the number of stepper motor pulses required to actuate the stepper motor 28 and the shutter mechanism 18 coupled thereto to a particular or desired aperture size. As shown in FIG. 3, numeral 88A represents the point in time at which the maximum aperture area represented by the curve 86A is achieved. A number representative of the number of stepper motor pulses required to actuate the stepper motor 28 to this point in time is stored in the look-up table 78. In a similar manner, numbers representative of the number of pulses required to actuate the stepper motor 28 to corresponding points 88B and 88C on curves 86B and 86C, respectively, are also stored in the look-up table 78. This is repeated for similar points on each of the remaining curves of the family of curves 80.

The other characterizing element of each curve in the family of curves 80 is the point in time 90A when the stepper motor 28 and the shutter mechanism 18 coupled thereto is actuated to the closed position in order to produce the remaining portion of an exposure interval represented by the curve 86A. A number representative of this point in time is also stored within the look-up table 78. In a similar manner, numbers representative of corresponding points 90B and 90C on curves 86B and 86C, respectively, are stored within the look-up table 78. This is repeated for similar points on each of the remaining curves of the family of curves 80. These points 90A, 90B, 90C etc. at which the stepper motor 28 is actuated to its closed position is determined by sensing the actual level of ambient scene light and comparing it to a previously stored reference level of ambient scene light. The stepper motor 28 is actuated to its closed position when these two signals are equal. The manner in which this is achieved will be described below in detail.

As noted above, a curve in the family of aperture area defining curves 80 is selected during each exposure cycle as a function of a combination of ambient scene light level and of subject reflectivity. Subject reflectivity is determined by the infrared light sensor 42 and ambient scene light level is determined by the visible light sensor 46, with these signals being routed to the look-up table 78 within the microcontroller and memory 76 through the paths 82 and 84, respectively. As a consequence of selecting a particular curve in the family of aperture area defining curves 80 in this manner, the look-up table 78 generates two characterizing elements or reference signals at the output thereof, one on an output path 92 and the other on an output path 94. The reference signal on the output path 92 is a signal representative of the number of stepper motor pulses required to actuate the stepper motor 28 and the shutter mechanism coupled thereto to produce an aperture area corresponding to, for example, point 88A on the curve 86A in FIG. 3. The reference signal on the output path 94 is a signal representative of, for example, the point in time 90A on the curve 86A in FIG. 3 when the stepper motor 28 and the shutter mechanism 18 coupled thereto is reversed or is actuated to the closed position in order to terminate the exposure interval representative by the curve 86A.

The reference signals on the paths 92 and 94 are applied to the exposure control electronics module 62. The exposure control electronics module 62 includes circuitry for controlling the actuation of the stepper motor 28 in response to these signals. Circuitry for controlling the number of pulses applied to the stepper motor 28 to actuate the shutter mechanism 18 between its fully closed position and an open position corresponding to, for example, point 88A on the curve 86A is shown in FIG. 4A.

With additional reference to FIG. 4A, there is shown a control circuit for disabling the stepper motor 28 while it is opening the shutter mechanism 18 once the number of pulses applied thereto equals the number of reference pulses generated by the look-up table 78 and applied to the exposure control electronics module 62 through the path 92. When an exposure interval is initiated, a drive signal in the form of a series of pulses from the microcontroller 76 is applied to one of the inputs 96 of an AND gate 98. The other input to the AND gate 98 is from an inverter 100, which allows the AND gate 98 to be satisfied, and therefore the pulses 95 on the path 96 are also applied to the stepper motor drive 30 through the AND gate 98 and a path 102. The stepper motor drive 30, in turn, actuates the stepper motor 28 to initiate forward movement of the shutter mechanism 18 toward an aperture size determined by a selected curve in the family of curves 80. In addition to being applied to the input 96 of the AND gate 98, these pulses are also applied to a counter 104 through a path 106. The output of the counter 104 is, in turn, applied to one input 108 of a comparator 110. The reference signal appearing on the path 92, representative of the number of pulses required to actuate the stepper motor 28 and the shutter mechanism 18 coupled thereto to form a particular size aperture, is applied to another input of the comparator 110 through a path 112. When the number of pulses or counts from the counter 104 appearing on the comparator input path 108 equals the number of reference pulses on the comparator input path 112, the comparator 110 applies an input to the inverter 100 whose output, in turn, disables the AND gate 98 and the stepper motor drive 30 to thereby preclude further forward stepping or movement of the stepper motor 28. This control of the stepper motor 28 by the control circuit of FIG. 4A to interrupt or terminate the forward movement of the stepper motor 28 when a particular shutter mechanism aperture has been achieved, as defined by a selected one of the curves 80, is repeated during each subsequent exposure cycle.

With additional reference to FIG. 4B, there is shown a control circuit for reversing the stepper motor 28 to close the aperture formed in the shutter mechanism 18 at, for example, the point 90A on the curve 86A in FIG. 3 in order to terminate the exposure interval represented by the curve 86A, when the requisite ambient scene light level has been sensed. The control circuit of FIG. 4B includes the integrator 45 that integrates the ambient scene light sensed by the photosensor 44 and stores such integration in a pair or network of storage capacitors 118. The integrator 45 and the photosensor 44 are located within the visible light sensor 46 and the output of the integrator 45 is coupled to the exposure control electronics module 62 through a path 120 (FIG. 1).

The photosensor 44 is coupled to the input of an amplifier 122 through a path 124 and a switch S1. The amplifier 122 is of a type sometimes referred to in the art as an "operational amplifier" which may be of a differential variety. When considered ideally, the amplifier 122 has infinite gain and infinite input impedance. In addition, the operational amplifier 122 is energized by the battery 54 by means of an interconnecting supply line 126 and a ground line 128.

By virtue of a feedback path comprising an integration capacitor C1 connected between the input line 124 and an output line 130 of the operational amplifier 122, the photosensor 44 is permitted to operator into an apparent low-input impedance so as to function in a current mode, the current generated by the photosensor 44 being limited substantially only by its own internal impedance. Thus, under such loading, the operational amplifier 122 in conjunction with the integration capacitor C1, is capable of providing a desirable linear output corresponding to the time integration of the ambient scene light incident on the photosensor 44. Switches S2 and S3 are momentarily and concurrently actuated to their closed positions in order to discharge the integration capacitor C1 prior to each integration of the output of the photosensor 44 to thereby prevent the introduction of integration errors that would otherwise result if any residual charge remained on the capacitor C1 prior to each such integration.

The storage capacitor network 118 includes storage capacitors C2 and C3 and network interconnecting switches S4, S5, S6 and S7. These switches are activated between their open and closed positions, in various combinations, to either discharge the storage capacitors C2 or C3 prior to storing an integrated ambient scene light signal therein in order to prevent integration errors, or for the storage of an integrated signal.

The storage capacitors C2 and C3 collectively store a signal representative of the total amount of ambient scene light sensed by the photosensor 44 during an exposure interval as defined, for example, by the curve 86A in FIG. 3. One capacitor stores the amount of such scene light sensed from the start of an exposure interval to the point represented by, for example, 88A. The other capacitor stores the amount of such scene light sensed from the start of the same exposure interval to the point represented by, for example, 90A. When the stepper motor 28 is actuated in either its forward or reverse direction, it steps or rotationally moves at the same rate of speed. Therefore, by adding the integrated scene light signal present on both of these capacitors to one another the sum is equal to the total amount of scene light sensed during the exposure interval defined by the curve 86A. A signal representative of this sum is applied to an input 132 of a comparator 134. The reference signal on the output path 94 of the microcontroller 76, representative of the point 90A on the curve 86A where the stepper motor 28 is to be reversed, is applied to an input 136 of the comparator 134. When these two signals are equal, the comparator 134 sends a stepper motor reverse signal to the stepper motor drive 30 through a path 138 thereby causing the stepper motor 28 to actuate the shutter mechanism 18 to its fully closed position.

The camera 10 is preferably designed for use with a self-developing film unit (not shown) similar to those described in U.S. Pat. No. 3,415,644 to Land, in common assignment herewith. The self-developing film unit is packaged in a lighttight film cassette 140 shown in the condition assumed just after the cassette 140 has been fully inserted into the camera 10. The cassette 140 may enclose the 6 VDC battery 54.

Mounted within the camera 10 is a film advancing apparatus 142 similar to that described in U.S. Pat. No. 3,753,392 to Land that includes a motor for operating a gear train (neither shown) which is coupled with the film advancing apparatus 142 to provide for the continuous movement of an exposed film unit from an exposure position within the camera 10 toward the exterior thereof. The film advancing apparatus 142 additionally includes a film-engaging arm member (not shown) driven by the above-mentioned motor and gear train. The arm is adapted to extend into a slot in the cassette 140, as shown in the above-noted Land '392 patent, and engage the uppermost film unit located therein at or near its trailing edge prior to moving it out of the cassette 140 and into the bite of a pair of conventional processing rollers (not shown). The processing rollers, which are rotated by the motor and gear train mentioned above, continue the uninterrupted movement of the exposed film unit toward the exterior of the camera 10 while simultaneously rupturing a container of processing liquid at the leading end of the exposed film unit. The processing rollers spread the liquid contents of the ruptured container between elements of the film unit to initiate formation of a visible image within the film unit in a manner that is well known in the art.

OPERATION

A typical exposure cycle will now be described in detail. For the purpose of this description it is assumed that the folding camera 10 is in its erect position, that the taking aperture of the blade mechanism 18 is in its fully closed position, that the openings 36 and 38 formed by the secondary apertures in the blade mechanism 18 are in their fully opened positions, that the folding camera 10 and the flash apparatus 48 have been energized by the prior closure of a switch 144 that coupled the battery 54 to the camera 10 and to the DC-DC voltage converter 52 through the exposure control electronics module 62 and a path 146 and that the main storage capacitor 50 is fully charged and is ready for the initiation of an exposure cycle.

With continued reference to FIG. 1, a switch 148 is actuated to its closed position by a camera operator to initiate an exposure cycle. The closure of the switch 148 couples the battery 54 to the exposure control electronics module 62 through a path 150. With the blade mechanism opening 38 adjacent the visible light sensor 46 in its fully open position, the exposure control electronics module 62 and the microcontroller 76 coupled thereto through a path 152, in turn, activate the visible light sensor 46 and the integrator 45 included therein through a path 154. When activated, the integrator 45 is enabled to integrate ambient scene light for a fixed period of time and then send the final integrated value thereof to the microcontroller and memory 76 through the path 154 for temporary storage.

Subsequent to the storage of the ambient scene light information in the microcontroller and memory 76, the exposure control electronic module 62 triggers the flash tube 56 through the path 60 to thereby illuminate the scene to be photographed with visible and infrared artificial light prior to the initiation of an exposure interval. The exposure control electronic module 62 then triggers the thyristor 58 to its open or off state through the path 64 thirty-five microseconds after turning on the flash tube 56 to thereby initiate the extinguishing of the light output of the flash tube 56. This triggering on and off of the flash tube 56 constitutes a first pulse of light directed toward the scene to be photographed.

The exposure control electronics module 62 and the microcontroller and memory 76 coupled thereto also activates the infrared light sensor 42 and an integrator (not shown) included therein through a path 156 for thirty-three microseconds or for two microseconds less than the period of time that the strobe 56 is triggered to its on or scene illuminating state in order to reduce integration errors. The exposure control electronics module 62 and the microcontroller 76 then cause the final value of the integration of the integrator within the infrared light sensor 42, which constitutes a measure of subject reflectivity, to be sent to the look-up table 78 within the microcontroller 76 through the path 82. Upon receipt of this subject reflectivity signal the look-up table 78 combines it with the previously stored ambient scene light information. These combined signals are then employed by the look-up table 78 to select one of the family of stepper motor controlling curves shown in FIG. 3 by producing a pair of stepper motor controlling reference signals on the microcontroller and memory output paths 92 and 94, as previously explained. At the time that the subject reflectivity signal is sent to the look-up table 78, this same signal is also sent to the infrared ranging system 70 by way of the path 120, the exposure control electronic module 62 and a path 156. The infrared ranging system 70 generates a subject distance signal in response thereto. The automatic focus control system 74, in turn, focuses the objective lens 12 in correspondence with this subject distance signal, in the above-described manner.

Upon receipt of the look-up table 78 generated signals on the path 92 and 94, the exposure control electronics module 62 and the microcontroller and memory 76 coupled thereto through the path 152 actuates the shutter drive 26 and the mechanically coupled blade mechanism 18 such that the openings 36 and 38 formed by secondary aperture pairs in the blade mechanism 18 are placed in their fully closed positions. In addition, the microcontroller 76 and exposure control electronics module 62 also actuate the shutter drive 26 to initiate an exposure interval. During an exposure interval an image of the object 14 formed by the taking lens 12 is reflected off the mirror 171 and focused onto the film plane 16.

The shutter drive 26 includes the stepper motor 28 (FIG. 2) as previously noted. The stepper motor 28 is mechanically coupled to one end of each of the shutter blade elements 20A and 20B through a pinion gear 158 mounted on a stepper drive shaft 160 that is in meshing relationship with a rack gear 162 formed in the shutter blade element 20A and a rack gear 146 formed in the shutter blade elements 20B. The other end of the blade elements 20A and 20B are slidably supported by a pin 166 supported in a fixed position by the camera housing and projecting through elongated openings 168 and 170 in the blade elements 20A and 20B, respectively. Rotation of the stepper motor drive shaft 160 in either direction causes the shutter blade elements 20A and 20B to translate in opposite directions to thereby form a particular taking aperture with the primary shutter blade element apertures 22A and 22B.

Assuming that the curve 86A of the family of curves 80 in FIG. 3 has been selected by the look-up table 78, the microcontroller 76 applies a series of pulses 95 to the stepper motor drive 30 through the stepper motor control circuit of FIG. 4A until the number of stepper motor drive pulses applied thereto equals the number of pulses corresponding to the point 88A on the aperture area versus time curve 86A in FIG. 3. Once this occurs, a particular predetermined taking aperture is formed by the primary apertures 22A and 22B and the stepper motor control circuit of FIG. 4A terminates stepper motor rotation in the above-described manner. The taking aperture formed by the primary apertures 22A and 22B when stepper motor rotation is terminated is maintained until a predetermined level of ambient scene light is sensed by the photosensor 44 and integrated by the integrator 45. This predetermined level of ambient scene light is equal to or corresponds to the reference signal on the output path 94 of the microcontroller and memory 76 and on the input path 136 of the comparator 134. As previously explained, this reference signal represents the point in time 90A on the look-up table selected aperture area versus time curve 86A when the stepper motor 28 is reversed and the shutter mechanism 18 coupled thereto is actuated to its fully closed position to terminate the exposure interval.

The point in time 90A on the curve 86A for reversing the stepper motor 28 to terminate the exposure interval is determined in the following manner. With particular reference to FIG. 4B, prior to the initiation of an exposure cycle the switches S2, S3, S6 and S7 are closed to insure that the capacitors C1, C2 and C3 are fully discharged for the reasons mentioned above. Also, the switches S4 and S5 are opened in order to isolate the storage capacitors C2 and C3 from the integrator 45, and the switch S1 is closed at this time. Actuation of the switches S1-S7 is under the control of the microcontroller and memory 76 coupled to the exposure control electronics module 62 through the path 152, once an exposure cycle has been initiated.

To prepare for integrating ambient scene light current from the photosensor 44 within the visible light sensor 46, the switch S3 is opened to remove the current-discharging short circuit across the integration capacitor C1 and the switches S6 and S7 are opened in order to release the current-discharging short circuit across the storage capacitors C2 and C3. After a short delay to allow the noise that is generated by the actuation of these switches to settle, the integrator 45 is enabled by opening the switch S2 and the storage capacitors C2 and C3 are enabled by closing the switches S4 and S5, respectively. The integrator 45 will now integrate the output of the photosensor 44 within the visible light sensor 46. In this configuration the voltage across the storage capacitors C2 and C3 will equal the voltage at the integrator output 130.

When the microcontroller 76 determines that the stepper motor 28 has been actuated to the point 88A on the curve 86A by monitoring the output of the comparator 110 (FIG. 4A), it causes the switch S4 to be actuated to its open position thereby disconnecting the storage capacitor C2 from the output of the integrator 45. However, the output of the integrator 45 remains coupled to the storage capacitor C3. The integrator 45 continues to integrate the output of photosensor 44 until a point in time corresponding to the point 90A on the curve 86A. The sum of the voltages on the storage capacitors C2 and C3 are simultaneously being applied to the input 132 of the comparator 134 during this integration process. When the sum of those voltages equals the reference voltage being applied to the input path 136 of the comparator 134, the comparator 134 sends a stepper motor reverse signal to the stepper motor drive 30 through the path 138 thereby causing the stepper motor 28 to actuate the shutter mechanism 18 to its fully closed position.

As noted above, the stepper motor 28 rotates at the same rate of speed when opening and closing the shutter mechanism 18. As shown in FIG. 3, the aperture area formed by the primary apertures 22A and 22B in the shutter mechanism 18 change as the same parabolic function of time. The reason that the area under the selected curve 86A in FIG. 3 representative of the total exposure interval is equivalent to the sum of the voltages on the storage capacitors C2 and C3 is primarily due to this predictable nature of the stepper motor 28 and the shutter mechanism 18 movement. As explained above, the ambient scene light integrated by the integrator 45 between the start of an exposure interval and a point in time corresponding to the point 90A on the curve 86A is stored in the storage capacitor C3. The ambient scene light integrated by the integrator 45 between the start of the same exposure interval and a point in time corresponding to the point 88A on the curve 86A is stored in the storage capacitor C2. Even though the integrated ambient scene light signal stored in the storage capacitor C2 is not a measure of the actual light being admitted through the primary apertures 22A and 22B from a point in time corresponding to the point 90A on the curve 86A to the end of the exposure interval, it can be directly substituted for a signal representative of such admitted light because of this equivalence between the change in scene light admitting aperture area when the stepper motor 28 and the shutter mechanism coupled thereto are actuated from their closed to their open and then from their open to their closed positions during an exposure interval.

Points on the curves 86B, 86C, etc. corresponding to points 88A and 90A on the curve 86A are respectively and similarly monitored by the circuits of FIGS. 4A and 4B when these curves are selected by the look-up table 78. At the completion of the stepper motor 28 driven exposure interval, the exposure control electronics module 62 actuates the film advancing apparatus 142 and the drive motor (not shown) through a path 172, to initiate the transport and processing of an exposed, self-developing film unit. The film advancing apparatus, in turn, moves the exposed film unit located in the cassette 140, through a path 174 into the bite of the pair of adjacent processing rollers (not shown), in the manner described above, to spread processing liquid between certain film layers and to move the exposed film unit toward an exit slot (not shown) in a housing 176 of the self-developing camera 10. After the exposed film unit has moved through the above-mentioned pair of rollers, a film movement completion signal is routed to the exposure control electronics module 62 through a path 178. Upon receipt of this signal and when the main storage capacitor 50 of the electronic flash apparatus 48 is fully charged, as sensed through the path 146, the exposure control electronics module 62 places the exposure control system of the camera 10 in condition for the initiation of the next exposure cycle.

From the foregoing description of the invention it will be apparent to those skilled in the art that various improvements and modifications can be made in it without departing from its true scope. The embodiment described herein is merely illustrative and should not be viewed as the only embodiment that might encompass the invention.

What is claimed:

1. A photographic camera, comprising:

means for defining a film plane;

an optical system for directing image-carrying light rays along an optical path from a scene onto photosensitive material located in said film plane;

a shutter mechanism comprising a pair of overlapping shutter blade elements with each shutter blade element having an aperture therein that cooperatively define an exposure aperture, said shutter mechanism being mounted for movement between a blocking arrangement in which said shutter mechanism is in light blocking relation with respect to the optical path so as to preclude scene light from being transmitted along the optical path to said film plane and an unblocking arrangement in which said shutter mechanism is in light unblocking relation with respect to the optical path so as to allow the passage of scene light to said film plane through said exposure aperture when said shutter mechanism is actuated between its said light blocking and unblocking arrangements to produce an exposure interval;

means for storing at least characterizing elements of each curve in a set of aperture area defining curves representative of a desired shutter mechanism aperture area variation as a function of time wherein each curve in said set of aperture area defining curves is representative of a shutter mechanism aperture having the same rate of increasing and decreasing aperture area change, and for generating shutter mechanism open and close reference signals in response to a selected one curve of said set of aperture are defining curves;

means for generating shutter mechanism open and close signals;

means for sensing ambient scene light level and subject reflectivity and for generating respective signals representative thereof;

means responsive to said ambient scene light level signal and to said subject reflectivity signal for selecting one curve of said set of aperture area defining curves; and drive means responsive to said shutter mechanism open signal and said shutter mechanism open reference signal for actuating said shutter mechanism between its said light blocking and its said light unblocking arrangements and responsive to said shutter mechanism close signal and said shutter mechanism close reference signal for actuating said shutter mechanism between its said light unblocking and its said light blocking arrangements.

2. The photographic camera of claim 1 wherein said drive means includes means for comparing said shutter mechanism open signal with said shutter mechanism open reference signal and for generating a first drive signal when these two signals are equal, means for comparing said shutter mechanism close signal with said shutter mechanism close reference signal and for generating a second drive signal when these two signals are equal and said drive means actuates said shutter mechanism from a blocking arrangement to a particular unblocking arrangement in response to said first drive signal and actuates said shutter mechanism from said particular unblocking arrangement to a blocking arrangement in response to said second drive signal.

3. The photographic camera of claim 1 wherein said drive means actuates said shutter mechanism at the same rate of speed for each selected curve in said set of aperture area defining curves when said shutter mechanism is actuated between its said light blocking and its said light unblocking arrangements.

4. The exposure control system of claim 1 wherein the variation in aperture area represented by each curve in the set of aperture area defining curves varies as a parabolic function of time.

5. The photographic camera of claim 1 wherein said drive means includes a stepper motor coupled to said shutter mechanism, said shutter mechanism open signal is a series of pulses applied to said stepper motor, said shutter mechanism open reference signal is a signal representative of the number of pulses required to actuate said stepper motor and shutter mechanism from a light blocking to a particular light unblocking arrangement, said shutter mechanism close signal is a signal responsive to said ambient scene light level signal and said shutter mechanism close reference signal is a signal representative of the level of ambient scene light required to actuate said stepper motor and shutter mechanism from said particular light unblocking arrangement to a light blocking arrangement.

6. A method of controlling the transmission of image-forming light rays along an optical path from a scene to photosensitive material located within photographic apparatus, comprising the steps of:

providing a shutter mechanism comprising a pair of overlapping shutter blade elements with each shutter blade element having an aperture that cooperatively define an exposure aperture, the shutter mechanism being mounted for movement between a blocking arrangement in which the shutter mechanism is in light blocking relation with respect to the optical path so as to preclude scene light from being transmitted along the optical path to the film plane and an unblocking arrangement in which the shutter mechanism is in light unblocking relation with respect to the optical path so as to allow the passage of scene light to the film plane through the exposure aperture when the shutter mechanism is actuated between its light blocking and unblocking arrangements to produce an exposure interval;

storing at least characterizing elements of each curve in a set of aperture area defining curves representative of a desired shutter mechanism aperture area variation as a function of time wherein each curve in the set of aperture area defining curves is representative of a shutter mechanism aperture having the same rate of increasing and decreasing aperture area change, and for generating shutter mechanism open and close reference signals in response to a selected one curve of the set of aperture area defining curves;

sensing an ambient scene light level and subject reflectivity and generating respective signals representative thereof;

selecting one curve of the set of aperture area defining curves in response to the ambient scene light level and subject reflectivity signals;

generating shutter mechanism open and close signals; and actuating the shutter mechanism between its light blocking and unblocking arrangements in response to the shutter mechanism open signal and the shutter mechanism open reference signal, and between its light unblocking and light blocking arrangements in response to the shutter mechanism close signal and the shutter mechanism close reference signal to produce the exposure interval.

7. The method of claim 6 wherein the step of actuating the shutter mechanism between its light blocking and unblocking arrangements includes the step of actuating the shutter mechanism as a parabolic function of time.

8. The method of claim 6 wherein the step of actuating the shutter mechanism includes the step of actuating the shutter mechanism between its light blocking and unblocking arrangements with a stepper motor coupled thereto that is responsive to the shutter mechanism open signal and the shutter mechanism open reference signal to actuate the shutter mechanism from its light blocking to its light unblocking arrangement, and responsive to the shutter mechanism close signal and the shutter mechanism close reference signal to actuate the shutter mechanism from its light unblocking arrangement to its light blocking arrangement.

* * * * *